United States Patent
Mosaner

Patent Number: 6,164,715
Date of Patent: Dec. 26, 2000

[54] EMERGENCY EXIT WINDOW OF A VEHICLE WITH A WINDOW PANE

[75] Inventor: Olaf Mosaner, Kassel, Germany

[73] Assignee: Hubner Gummi-und Kunstoff GmbH, Kassel, Germany

[21] Appl. No.: 09/346,242

[22] Filed: Jul. 1, 1999

[30] Foreign Application Priority Data

Jul. 3, 1998 [DE] Germany .................. 198 29 737

[51] Int. Cl.7 .............. B60J 1/08; B60J 1/12; E05B 65/10
[52] U.S. Cl. ................ 296/146.1; 296/146.15; 296/146.16; 296/201; 49/141
[58] Field of Search ............. 296/146.1, 146.15, 296/146.16, 201; 49/141

[56] References Cited

U.S. PATENT DOCUMENTS

| | | | |
|---|---|---|---|
| 3,739,527 | 6/1973 | Schubach | 49/466 |
| 4,283,885 | 8/1981 | Remick et al. | 49/466 |
| 4,635,396 | 1/1987 | Ranz et al. | 49/141 |
| 4,978,089 | 12/1990 | Alquier et al. | 244/129.5 |
| 5,746,026 | 5/1998 | Brede et al. | 49/506 |

FOREIGN PATENT DOCUMENTS

| | | | |
|---|---|---|---|
| 000061198A | 9/1982 | European Pat. Off. | 296/146.15 |
| 2341726 | 2/1976 | France . | |
| 2684051 | 11/1991 | France . | |
| 003428506 | 2/1986 | Germany | 296/146.15 |

Primary Examiner—D. Glenn Dayoan
Assistant Examiner—Greg Blankenship
Attorney, Agent, or Firm—Thomas R. Vigil

[57] ABSTRACT

The invention relates to an emergency exit window of a vehicle with a window pane (1) and a window frame profile (10), whereas the window frame profile (10) is retained by the window bay in the wall (20) of the vehicle, whereas the window frame profile (10) is provided with a recess (14) for the location of the window pane (1), the window frame profile (10) being provided with an opening (17) that is located at some distance of the front side of the window pane (1) and that is intended to detachably receive a first expansion member (30), a second expansion member (60) being arranged opposite the first expansion member (30) in the window frame profile (10), whereas the window bay of the vehicle is provided with a hook-shaped bracing (120) of the window frame profile, whereas the hook-shaped end of the bracing (120) is engaged in the window frame profile (10) and whereas the hook-shaped end of the bracing (120) is inserted in the window frame profile (10) at some distance of the second expansion member (60) in vertical direction.

13 Claims, 3 Drawing Sheets

EMERGENCY EXIT WINDOW OF A VEHICLE WITH A WINDOW PANE

BACKGROUND OF THE INVENTION

1. Field of the Invention

The present invention relates to an emergency exit window of a vehicle with a window pane and a window frame profile, whereas the window frame profile is retained by the window bay in the wall of the vehicle, whereas the window frame profile is provided with a recess for the location of the window pane, the window frame profile being provided with an opening that is located at some distance of the front side of the window pane and that is intended to detachably receive a first expansion member, a second expansion member being arranged opposite the first expansion member in the window frame profile.

2. Description of the Prior Arts

An example of an emergency exit window is FR 26 84 051. Here, a window frame profile with a very complicated shape is borne in a part constituting a sealing lip, whereas this part may be tilted outwards for taking off the window pane. A disadvantage thereof is the considerable strength that is necessary to tilt this part of the window frame profile outwards, since the corresponding part of the window frame profile is describing a movement having the shape of a circular arc during the tilting procedure. At the summit of this movement describing a circular arc, the window pane is pressed against the opposite seal.

An emergency exit window of the type mentioned above is described in of FR 23 41 726. Here, the window frame profile has a groove receiving the window pane, whereas expansion members are provided on both sides of the window frame profile in the window frame profile and are borne in a channel-like opening. On both sides of the window pane, levers are provided for taking out the window pane These levers are gripping under the sealing lips of the window frame profile. By tearing off the lips underneath the expansion members, said expansion members fall off. Now the pane may be taken out of the window frame profile. The chain molecules of the window frame profile rubber are not uniformly aligned; it is thus very unlikely that the lips may be torn off in a clean way. It is more likely that the corresponding lip is torn off so that the expansion member does not fall out of the profile body, so that the window pane cannot be pushed out of the frame. Another disadvantage is that the handles are rigidly mounted on the window frame profile. Anybody could take such a window pane out of its seal, which promotes vandalism.

SUMMARY OF THE INVENTION

The object of the present invention is therefore to provide an emergency exit window of the type mentioned above that is easy to handle, inexpensive to produce and whose window pane may, in case of an emergency, be taken out on both sides without promoting vandalism.

The solution of the invention is to provide the window bay of the vehicle with a hook-shaped bracing of the window frame profile, whereas the hook-shaped end of the bracing is engaged in the window frame profile and the hook-shaped end of the bracing is inserted in the window frame profile at some distance to the second expansion member in the vertical direction. This clearly shows that the window pane may be removed out of the window frame profile on both sides of the vehicle, that means that it can be removed to the inside as well as to the outside. The one expansion member is more particularly removably or detachably inserted circumferentially into the channel-like opening arranged circumferentially in the window frame profile. The same is true for the second expansion member, which is also detachably and thus removably inserted circumferentially into a channel-like opening arranged circumferentially in the window frame profile. This explains that, when the corresponding expansion member is taken out of its opening, the window frame profile is losing some of its tension at the corresponding place, so that the window pane may be pushed out. With reference to the first expansion member that is inserted in the window frame profile from the outside, the window pane itself is released. With reference to the other, second expansion member that is located inside the vehicle, the hook-shaped end of the bracing of the window frame profile is released by the window frame profile after the second expansion member has been removed. This entails that the window pane may be pushed out of the window bay of the vehicle together with the window frame profile.

In order to facilitate the handling in case of an emergency, the corresponding expansion member is advantageously provided with a handle-like element. The handle-like element that is arranged on the first expansion member may be tilted in the sense that it may be swung out. Thus, in case of an emergency, the corresponding expansion member may be pulled out of the channel-like opening more easily. That means that the handle-like element is, in the first place, lying flat on the window frame profile, so that normally the handle-like element is not offering any air resistance. The handle-like element arranged on the second expansion member located inside has a handle placed under a lining so that it is covered. When the corresponding expansion member has been pulled out of its channel-like opening by a predetermined length by means of the handle-like element, the expansion member itself may be seized, serving thus as a handle to completely pull it out of the channel-like opening.

According to an advantageous feature, at least the one handle-like element is secured by a locking, so that the improper use of the handle-like element may be excluded. In case of an accident, the locking is centrally unlocked. Only then the handle arranged on the first expansion member situated outside may be actuated. The handle of the expansion member situated inside is guarded from vandalism by the lining. Said lining has to be removed in case of an emergency.

According to another characteristic, the bottom of the recess runs diagonally to the outer side of the vehicle and ascends toward the center of the window pane. Accordingly, the window pane has a slant fore-part. If a double glass pane is used, this double glass pane is at first designed step-by-step, getting a corresponding slant fore-part by means of a subsequent, triangular insertion. Such a slant fore-part combines two advantages; the first is that it facilitates the taking out of the window pane, the second that, compared to a straight fore-part, the bearing surface is bigger, thus achieving a better sealing.

According to another characteristic of the invention, a rope-shaped traction element seizing the window pane is inserted in the recess of the window pane and connected to the one expansion member. When the expansion member is taken out, the rope is directly subjected to strain too, so that the window pane may be removed from the window frame profile by means of the rope. The rope is connected, more particularly glued, to the triangular insertion. The window frame profile has a slot through which the rope may be guided when the expansion member is taken out. The advantage thereof is that, when the expansion member, which has a wedge-shaped section and is inserted circumferentially in the channel-like opening also circumferentially arranged in the window frame profile, is pulled out by a certain length of the channel-like opening, said expansion member is offering an excellent shoulder permitting to provide the strength necessary to remove the window pane out of the window frame profile as this was already shortly described above.

Thanks to such a slant bearing surface in the recess, a "window with even profiles" may be provided. A "window with even profiles" means a window without outer sealing lips. At least one circumferential sealing lip may nevertheless be arranged on the inner side, i.e. on the vehicle's inner side, on the window frame profile. That means that the window area of the window pane is essentially aligned with the window frame profile and the wall of the vehicle.

The invention is explained in more details with the help of the drawing:

DESCRIPTION OF THE PREFERRED EMBODIMENT(S)

Figure 1:
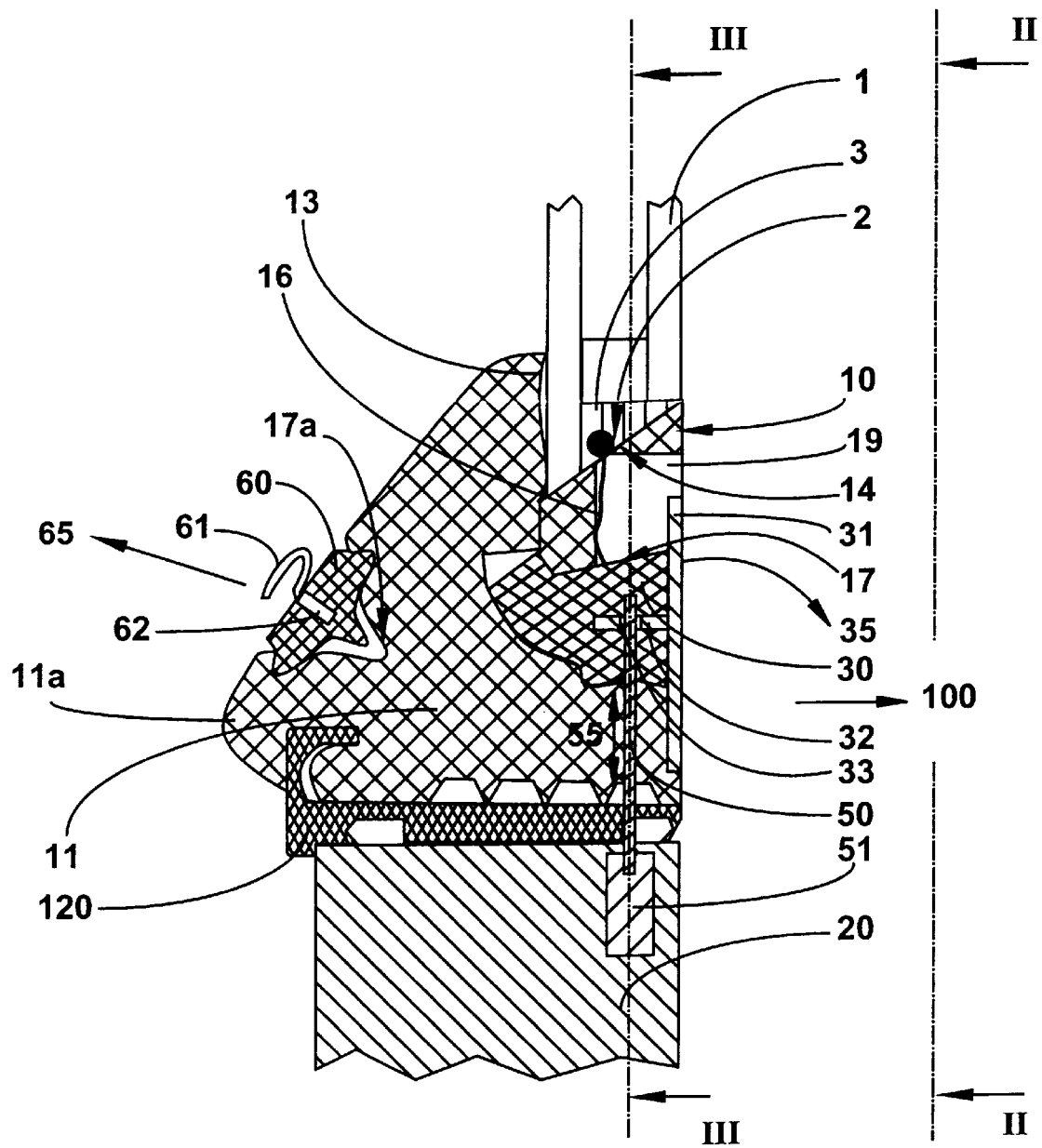
FIG. 1 shows a sectional side view of the emergency exit window.
Figure 2:
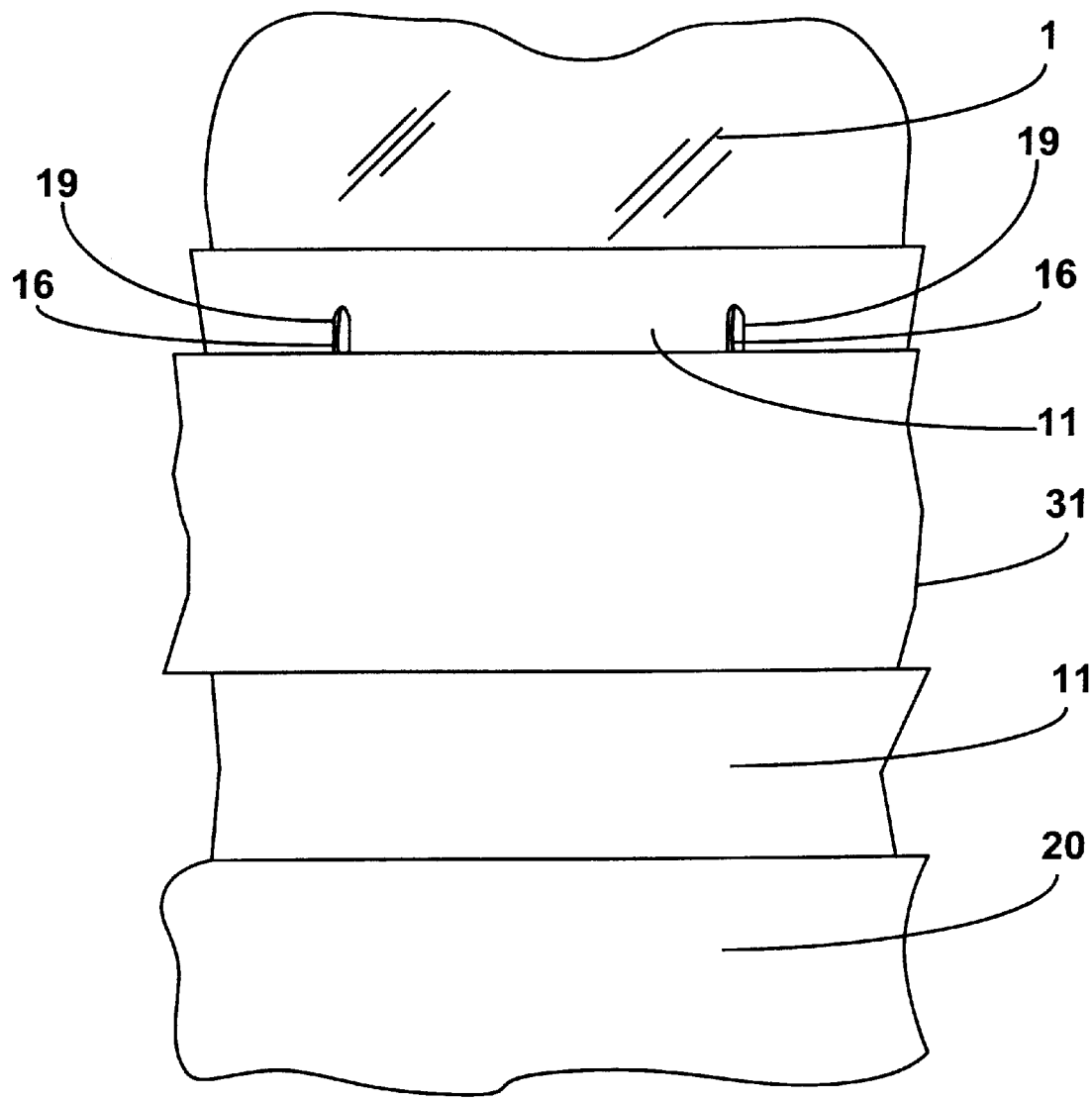
FIG. 2 shows a view along the line II/II of FIG. 1.
Figure 3:
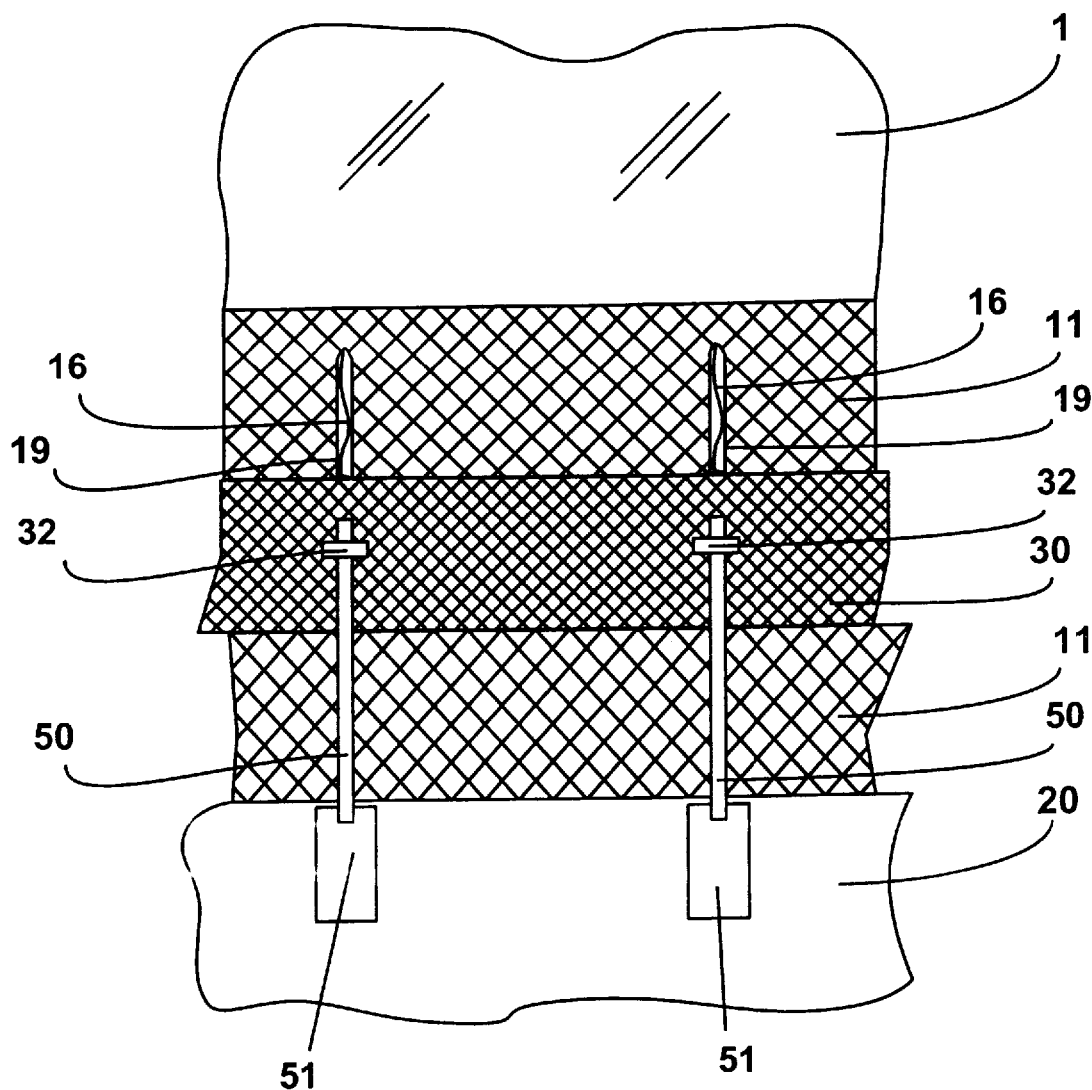
FIG. 3 shows a section along the line III/III of FIG. 1.

With reference to FIG. 1, the window pane is designated with numeral 1, the window frame profile with numeral 10 and the coach body or wall with numeral 20. The window pane 1 is designed as a double window pane whose fore-part (arrow 2) is slant. Since the window pane 1 itself cannot be cut diagonally, it is made step-by-step, the slant shape being achieved by inserting a wedge-shaped element 3 into the step.

The window frame profile 10 essentially consists of the rubber element 11 with the sealing lip 13 that is sitting close to the window pane 1 on the inner side of the vehicle. The window frame profile 10 designed as a rubber element 11 is provided in the area of the sealing lip with a recess 14, the bottom of the recess 14 being slant according to the design of the fore-part of the window pane 1 The rope 16 is situated in the area of the bottom of recess 14. Said rope 16 seizes the fore-part of the window pane 1 and is connected with the expansion member 30. The rope 16 is connected with the fore-part of the window pane 1 by glueing the rope 16 to the element 3, whose section is wedge-shaped or whose shape is triangular.

The expansion member 30 is inserted in the channel-like groove 17 of the window frame profile 10. The expansion member 30 has the handle-like element 31, which is provided with a web 32 anchored in the expansion member 30 itself. The web 32 is provided with a boring 33 into which a pin 50 is engaged. Said pin 50 is a component part of a magnetic switch 51 for example and may be moved alongside the arrow 55 in order to release the handle-like element 31 when needed, i.e. in case of an accident. Once released, the handle-like element 31, which is designed as a plate sitting in alignment with the window frame profile body, is taken from behind by the fingers and swivelled according to arrow 35. This movement is also pulling the expansion member 30 out of the channel-like opening, As already explained above, the circumferential expansion member itself may then be seized and be pulled further out of the channel-like opening, the window pane is simultaneously pulled out of the recess by means of the traction element and the rope 16. The rope 16 is hereby guided into a slot 19 arranged in the profile body, the slot 19 extends through the profile body until reaching the outside of it.

On the opposite side of the first expansion member 30, a, second expansion member 60 is arranged in a channel-like opening or groove 17a. Underneath this expansion member 60, the hook-shaped end of the hook-shaped bracing 120 seizes the window frame profile 10. This hook-shaped bracing 120 is arranged in the window bay of the coach body. The expansion member 60 has, just as the expansion member 30, a handle-like element 61, that is sitting in alignement with the window frame profile 10. The handle-like element 61 is connected with the expansion member 60 via a web 62 so that the expansion member 60 may be pulled out of the channel-like opening 17a when the handle-like element is pulled out in the direction indicated by the arrow 65. By taking the expansion member 60 out, the hook-like end of the hook-shaped bracing 120 of the window frame profile 10 is released by the nose 11a of the rubber element 11 Thus, the window pane 1 may be completely removed, together with the frame profile 10, from the surrounding wall of the coach body in direction of the arrow 100.

I claim:

1. Emergency exit window for a vehicle having a window pane (1) and a window frame profile (10), the window frame profile (10) being retained by a wall (20) of the vehicle, the window frame profile (10) being provided with a recess (14) for locating the window pane (1), and the window frame profile (10) being provided with an opening (17) that is located at a distance from a front side of the windows pane (1) and located to detachably receive a first expansion member (30), and a second expansion member (60) being arranged opposite the first expansion member (30) in the window frame profile (10), characterized in that bracing means are located in the window bay of the vehicle and said bracing means comprises a hook-shaped bracing (120) for the window frame profile, a hookshaped end of the hook-shaped bracing (120) being engaged in the window frame profile (10) and the hook-shaped end of the bracing (120) being inserted in the window frame profile (10) at a distance from the second expansion member (60) in a generally vertical direction.

2. Emergency exit window according to claim 1, characterized in that the first expansion member (30) is circumferentially inserted into the channel-like groove (17) and arranged circumferentially in the window frame profile (10).

3. Emergency exit window according to claim 1, characterized in that the second expansion member (60) is circumferentially inserted into a channel-like opening (17a) and arranged circumferentially in the window frame profile (10).

4. Emergency exit window according to claim 1, characterized in that at least one of said first and second expansion members (30, 60), is provided with at least one handle-like element (31, 61).

5. Emergency exit window according to claim 4, characterized in that the at least one handle-like element (31) is tilted.

6. Emergency exit window according to claim 4, characterized in that the at least one handle-like element (31, 61) is held in place by locking means (50).

7. Emergency exit window according to claim 1, characterized in that a bottom of the recess (14) extends diagonally to an outer side of the vehicle and ascends toward a center of the window pane (1).

8. Emergency exit window according to claim 7, characterized in that the window pane (1) has a correspondingly slant fore-part (arrow 2).

9. Emergency exit window according to claim 1, characterized in that the window pane (1) is connected by a rope (16) with the first expansion member (30), whereas the window frame profile (10) is provided with a slot (19) for the rope (16).

10. Emergency exit window according to claim 9, characterized in that the rope (16) is glued on the window pane (1).

11. Emergency exit window according to claim 1, characterized in that the window pane (1) is designed as a double window pane.

12. Emergency exit window according to claim 1, characterized in that an outer surface of the window pane (1) is substantially aligned with the window frame profile and the wall of the vehicle.

13. Emergency exit window according to claim 1, characterized in that the window frame profile (10) is provided on at least one side of the window pane (1) with a circumferential sealing lip (13).

* * * * *